Oct. 26, 1965 H. J. McCREARY 3,214,746

ELECTROMAGNETIC DELAY HEAD

Filed June 7, 1961 2 Sheets-Sheet 1

INVENTOR.
HAROLD J. McCREARY
BY John L Jackson
ATTORNEY

ELECTROMAGNETIC DELAY HEAD

Filed June 7, 1961 2 Sheets-Sheet 2

HAROLD J. McCREARY
INVENTOR.

BY John L Jackson

ATTORNEY

United States Patent Office 3,214,746

Patented Oct. 26, 1965

3,214,746
ELECTROMAGNETIC DELAY HEAD

Harold J. McCreary, Canoga Park, Calif., assignor, by mesne assignments, to The Bunker-Ramo Corporation, Stamford, Conn., a corporation of Delaware Filed June 7, 1961, Ser. No. 115,537
5 Claims. (Cl. 340—174.1)

This invention relates to magnetic heads in general and more particularly to a magnetic head which is capable of simultaneously reading from and writing on a single channel of a magnetic memory storage unit.

Often in computer applications a need arises for a single magnetic head which is capable of simultaneously reading from and writing on a channel of a magnetic drum, disc, tape, or other moving magnetic medium. One such example is where binary information is to be read from a particular location in memory, acted upon by a computer or other associated device and the result recorded in the same memory location. In this manner, for example, each word of a channel on a magnetic drum may be made to act as an individual counter. The binary information contained in each memory word is serially read from the drum each revolution and one added to it in the event its associated external sensing device has sensed the presence of another of the articles being counted since the last drum revolution. In this type application the amount of associated external circuitry which is required increases almost proportionally to an increase in the separation between the reading and writing portions of the magnetic head. For example, if the read and write stages of the magnetic head are spaced only four bits apart, a four bit shift register will suffice to temporarily store the information read from the drum until it can be reinserted four digit times later when the write stage of the head is over the memory location from which the information was read. If an eighteen bit separation exists between the read and write stages of the magnetic head, an eighteen stage shift register would be required.

In prior art delay heads relatively close spacing of the read and write stages could not be achieved, not due to physical configuration limitations but due to cross talk between the respective stages. Cross talk between read and write stages of a magnetic head or between separate read and write heads normally arises due to the relative inefficiency in magnetic recording. Due to this relative inefficiency, a large amount of current must be pumped through the write winding of a head to impress a flux pattern on the magnetic medium which when read from the drum will provide good signal to noise ratios. Additionally, upon reading from a magnetic medium, the read signal is normally quite low and must normally be greatly amplified to raise it to the logical levels of the associated computer. Thus, it can be seen that with the high amplification of the read signal in conjunction with the relatively high write current, cross talk often exists between heads.

An ideal delay magnetic head with very little interstage cross talk while writing at sufficient write current levels and obtaining a sufficient read signal upon reading must possess magnetic separation between the two stages. This magnetic separation can be accomplished in several ways. For instance, sufficient magnetic shielding between the two stages would accomplish magnetic separation. It has been found, however, that when sufficient shielding is placed between the read and write stages of the usual delay magnetic head to lower cross talk to acceptable levels, the thickness of the shielding material prevents close spacing of the stages. Likewise, reducing the write current supplied the head would reduce the flux produced while writing and consequently reduce the write flux detected by the read stage of the head; however, the flux pattern produced on the magnetic medium by the reduced write current would be proportionately reduced unless some method were found of preventing substantially all undesirable flux leakage from the write head and concentrating it across the gap of the head.

It is, therefore, an object of the present invention to provide a magnetic head which is capable of simultaneously reading from and recording on a memory channel while the respective gaps thereof are spaced as near as .032″ apart.

Another object of the present invention is to provide a magnetic head which is capable of simultaneously reading from and recording on a channel of a magnetic memory with very little cross talk while the respective read and write stages are spaced relatively close together.

Another object of the present invention is to provide a magnetic head which employs a novel gap arrangement to provide high flux concentration across the gap thereof.

Another object of the present invention is to provide a magnetic head which is capable of simultaneously reading from and recording on a channel of a magnetic memory which requires relatively low write currents and which provides relatively high read signals.

Another object of the present invention is to provide a magnetic head which will enable simultaneous reading from and recording in a particular memory location with very little associated electronic circuitry.

Other and further objects and advantages of the present invention will become apparent to one skilled in the art from a consideration of the following detailed description when read in light of the accompanying drawings, in which.

Briefly, the preferred embodiment of the present invention utilizes identical read and write stages, each of which utilizes a novel silver wedge gap configuration to provide high gap flux concentration.

Figure 1:
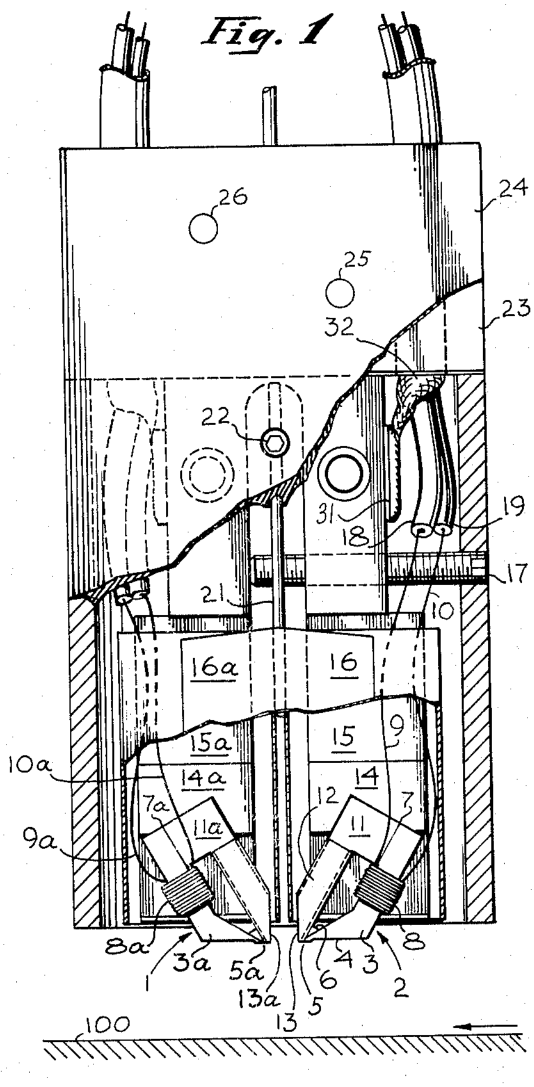
FIG. 1 is a cutaway front view of the preferred embodiment of the subject magnetic delay head.
Figure 3:
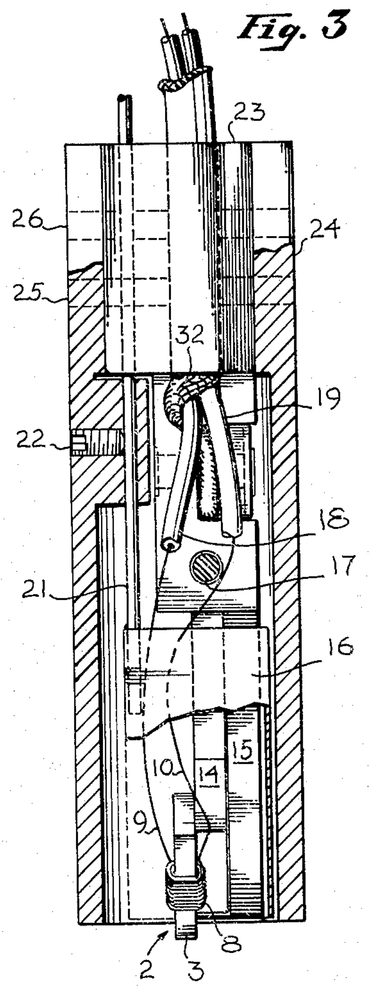
FIG. 3 is a cutaway side view of the preferred embodiment of the subject magnetic delay head.

Refer first to FIG. 1 wherein is shown a cutaway front view of the preferred embodiment of the subject magnetic delay head. In FIG. 1 is shown a delay type magnetic head having two stages, stage 1 and stage 2. Stages 1 and 2 are both capable of reading and writing. Stages 1 and 2 are identical and therefore description will herein be made of only stage 2.

Figure 4:
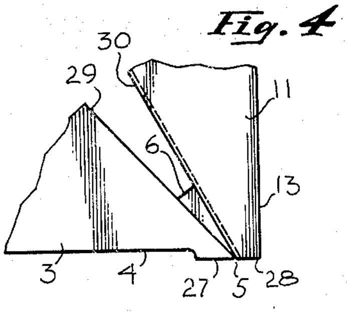
FIG. 4 is a blow-up of the gap portion utilized in both the read and write portions of the subject magnetic delay head.

Stage 2 comprises a yoke 3 in magnetic association with a bar 11 across an upper gap 7 and a working gap 5. A winding 8 is wound upon yoke 3 while a layer of silver 12 approximately .001″ thick is plated upon three sides of that portion of bar 11 which is substantially parallel to the coil portion of yoke 3. The foot portion 4 of yoke 3 is substantially parallel to the magnetic medium 100 and, as best shown by FIG. 4, adjacent the gap portion 5 is a protrusion 27 which is substantially one-half bit in length. The face of the protrusion 27 adjacent the magnetic medium 100 is substantially parallel to the magnetic medium. The bar 11 has an outer face 13 ground or formed thereon which is substantially parallel to the outer face 13a of stage 1. The bar 11 has a protrusion 28, the face of which is substantially one-half bit in length.

As shown in FIG. 4, as will hereinafter be described in detail, the gap 5 is substantially wedge shaped in configuration when viewed from the side and is formed by inner faces 29 and 30 of bar 11 and yoke 3 respectively. Contained within gap 5 is a shim of silver 6 which is substantially wedge shaped in configuration.

Figure 2:
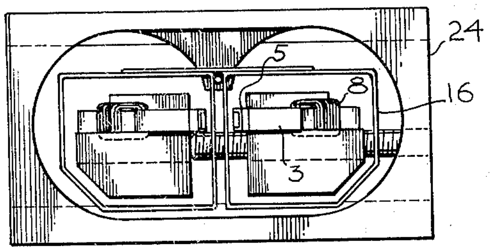
FIG. 2 is a bottom view of the preferred embodiment of the subject magnetic delay head.

Stage 2 is mounted upon a block 14 which is in turn mounted upon extension 15 of frame member 23. Stage 2, as best illustrated by FIG. 2, is encompassed by a magnetic shield 16 of mu metal or other similar shielding materials. This magnetic shield is attached to adjustment rod 21 which in turn passes through frame member 23. A cinch screw 22 is provided for holding the shield 16 in place when proper adjustment has been achieved.

A screw member 17 passes through outer case 24 and is threaded into extension 15 such that rotation of the screw member will cause extension 15 of stage 2 and 15a of stage 1 to move apart or move together to increase or decrease the spacing of the gaps of the respective stages. When stages 1 and 2 are secured to their respective mounting blocks 14 and 14a, they are secured in such a position that when screw member 17 is not in contact with extension 15a, the respective gaps 5 and 5a of stages 2 and 1 respectively are separated by the minimum distance that the heads are to be operated at. Thus, through rotation of screw 17, the respective gap portions of stages 1 and 2 can be correctly spaced.

A grounding clip 31 is secured to extension 15 and a ground lead 32 is attached thereto. Read pulses are detected or write pulses are passed along leads 9 and 10 from winding 8 and are secured to insulated leads 18 and 19, respectively.

Outer cover 24 is secured to frame member 23 by means of roll pins 25 and 26. For illustrational purposes, assume that the magnetic medium 100 is moving in the direction indicated by the arrow associated with FIG. 1, and assume that information is to be read by stage 2, acted upon, and the modified information rewritten on the drum by stage 1. The previously recorded flux pattern recorded on the magnetic medium 100 passes up through the yoke 3 and down through the bar 11 of stage 1 causing a read signal to be induced in coil 8. This signal is fed along leads 9 and 10 to associated electronic circuitry (not shown). The information is then acted upon and a write current is fed along lines 9a and 10a to coil 8a, which is wound upon yoke 3a of stage 1. This write current causes flux to flow from yoke 3a across back gap 7a, down bar 11a through the magnetic medium 100 and back into yoke 3a.

Figure 6:
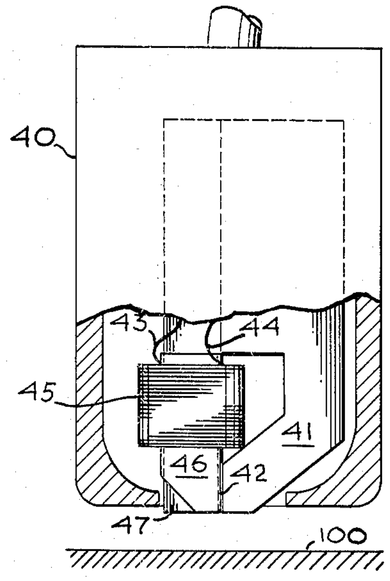
FIG. 6 is a cutaway front view of a conventional magnetic head.

Refer next to FIG. 6 wherein is shown, for the purposes of description of flux flow, a magnetic head which is widely used at the present time. The bar 47 and yoke 41 are separated from each other by a thin layer of silver 46, the thickness of which determines the gap width of the head. Consider a writing application wherein current is applied along lines 43 and 44 to winding 45. It can readily be seen that, even though the silver 46 is provided to limit the amount of flux which leaks from bar to yoke across gap 48 that a substantial amount of flux does leak across, thereby reducing the effective flux which passes from bar 47 through the magnetic medium 100, and back into yoke 41. Provision of the thin layer of silver 46 is, however, important in that it reduces, by a considerable amount, the pulsating or alternating flux leakage from the bar to the yoke, and this type of head has been found to be satisfactory in those instances where sufficient write current can be provided to coil 45, such that adequate flux reaches the associated magnetic medium 100. Applicant first experimented with this type of head and gap configuration. However, it was found that, when sufficient write current was applied to winding 45, such that a flux pattern was impressed upon the magnetic medium 100, regardless of the shielding employed, a large amount of this write flux was detected by the associated read head such that the information content of the read material was obliterated.

Applicant then made several modifications to the existing head in an attempt to obtain higher head sensitivity such that with conventional type shielding, the flux produced by the write current which is detected by the read head is small percentagewise so that the information content of the material read from the magnetic medium is not destroyed. Applicant first tilted the read and write stages with respect to each other, as shown in FIG. 1, in order to obtain maximum physical separation between the coils of respective heads such that any stray write flux would have a longer distance to travel to the read stage. After extensive experimentation, it was found that good results could be achieved when the coils of the read and write stages were widely spaced and disposed at substantially right angles with respect to each other. At the same time that applicant tilted the heads with respect to each other, he also experimented with plating the .001″ silver layer on the bar of each head and grinding the bars off such that the flat faces 13 and 13a (FIG. 1) were substantially parallel with respect to each other. In this manner a minimum area of each stage is disposed closely adjacent the other stage. Again, this plating of the silver layer on three sides of the bars 11 and 11a along with the grinding of the flat faces 13 and 13a resulted in reduced cross talk between the heads. However, at this stage of development, due to the high amplification of the read signal, sufficient cross talk was detected at seven bits (.0154″) gap separation to make the read information somewhat unreliable. Since, as previously explained, the closer the gap separation which can be achieved, the less complex the requisite associated electronics, applicant continued to experiment in an attempt to reduce the cross talk at seven bits separation and, if possible, achieved even smaller workable gap separations.

Since head sensitivity is equal to the ratio between the reluctance of the gap and the reluctance of the magnetic circuit, it can be seen that, generally speaking, by increasing the reluctance of the gap, the sensitivity of the head can be increased. One obvious way of increasing the reluctance of the gap is to increase the gap width. However, since the frequency response of the head is a function of the gap width, this parameter had to remain at approximately .001″ in order that the proper frequency of the computer with which the head was designed to work could be attained. Likewise it can be seen that, by decreasing the reluctance of the ferrite, the sensitivity of the head can be increased. Better ferrites were obtained but the desired level of sensitivity still could not be attained. Next, applicant concentrated on increasing the reluctance of the gap as hereinafter described.

Figure 7:
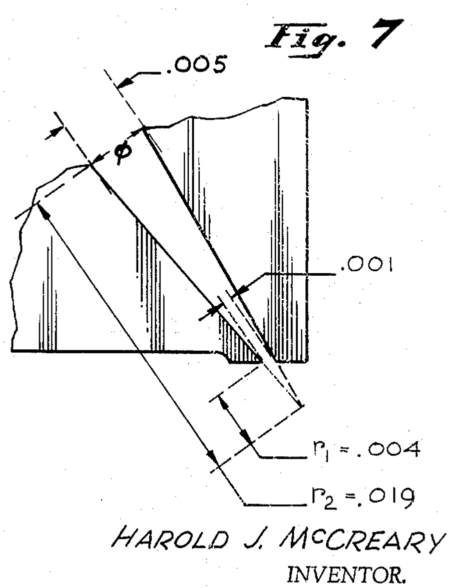
FIG. 7 is a view of a gap portion constructed in accordance with the present invention which will facilitate a theoretical discussion thereof.

One method of increasing the effective gap width of a head without increasing the actual gap width is to use a wedge-shaped gap, as illustrated in FIGS. 4 and 7. Considering the gap of FIG. 7 as being an air gap, the permeance of the gap may be determined in accordance with the following equation:

$$P=\frac{\mu l}{\phi}\log\frac{r_2}{r_1} \qquad \text{Eq. 1}$$

where $\phi$=to the angle of the gap in radians
$\mu$=permeability
$l$=head width
$r$=distance from widest portion of gap to point of intersection of lines extending gap surfaces measured along the bisector of the angle.

Consider a magnetic head having a configuration as shown in FIG. 7. It can be seen that the permeance is equal to $$P=\left(\frac{.1016\text{ cm.}}{\left(\frac{.005}{.019}\right)}\right)\log_\epsilon\left(\frac{.019''}{.004''}\right) \qquad \text{Eq. 2}$$

Thus $$P=.603$$

Since reluctance is equal to $1/P$, the reluctance of the wedge gap of FIG. 7 is 1.655.

Consider next a gap of dimensions shown in FIG. 6. The reluctance of the gap shown in FIG. 6 is given by the equation $$Re=\frac{l}{\mu A}$$

where $l$=distance across gap
$\mu$=permeability
$A$=cross section area of gap.

It can be seen that therefore the reluctance is equal to $$Re=\frac{.00254\text{ cm.}}{(.015)(.040)\times 6.45}=.656$$

Thus it can be seen that the wedge gap increases the sensitivity of the head by $$\frac{1.655}{.656}=2.53\text{ times.}$$

Figure 5:
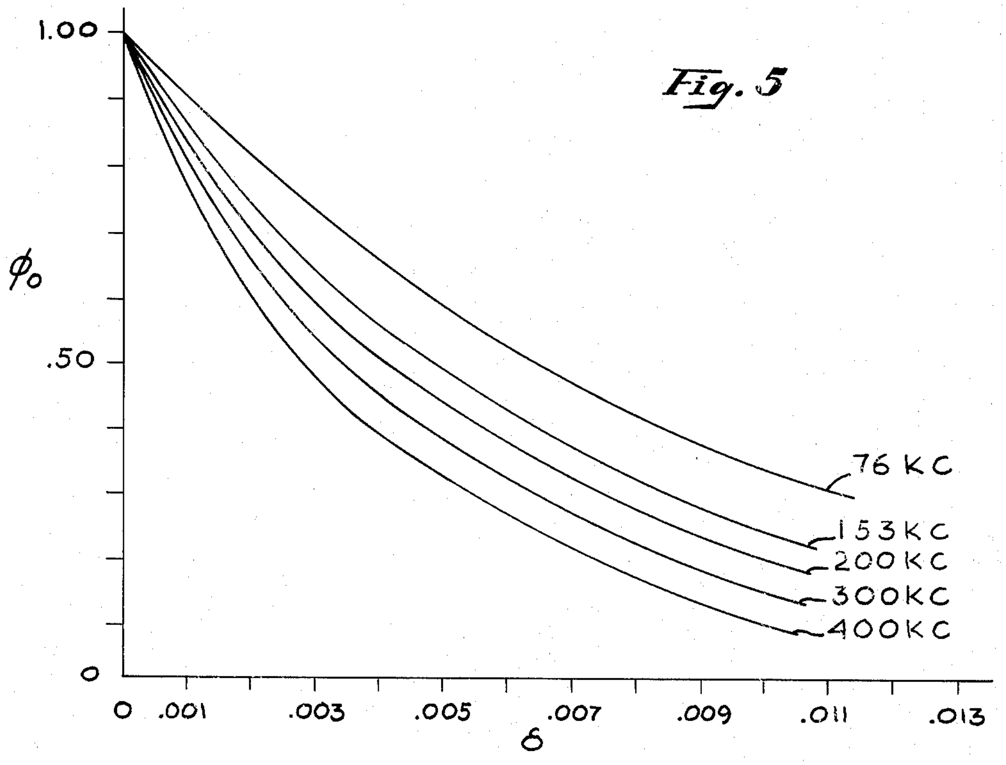
FIG. 5 is a chart wherein a percentage of flux penetration at various frequencies of certain depths is shown.

Refer next to FIG. 5 wherein is shown a chart of percentage flux penetration plotted against depth of penetration in thousands of an inch for five selected frequencies. The chart of FIG. 5 was derived from a publication "Non Destructive Tests," A.S.T.M. No. 223, page 17, "Libby on Introduction to Eddy Current Methods," which sets forth depth of penetration of eddy currents with frequency of various materials.

The depth in inches of the plane where eddy current has decreased to $1/E$ times the value at the surface is given by $$\delta=3.158\sqrt{\frac{\rho}{f\mu}} \qquad \text{Eq. 3}$$

where $\delta$=depth of penetration in inches
$\rho$=volumn resistivity in microhm-inch
$\mu$=relative magnetic permeability=1 for air or silver
$f$=frequency, c.p.s.

Applicant utilized the curve for eddy current penetration of copper since silver and copper are substantially the same conductivity (silver being slightly better). Applicant hypothesizes that since when an alternating flux attempts to pass through a good conductive material, eddy currents are produced and, since according to Lenz's Law a magnetomotive force is produced by these currents which opposes the magnetic flux which produces them, the depth of penetration of eddy currents would be substantially equal to the depth of penetration of flux. Applicant subsequently experimentally proved the truth of these theses. Thus, the depth $\delta$ of the plane at which eddy currents or magnetic flux has attenuated from a flux $\phi_0$ at the surface or to a value $\phi$ at depth $\delta$ is given by the following equation:

$$\phi=\phi_0\epsilon^{-361\delta\sqrt{f}} \qquad \text{Eq. 4}$$

My equation for silver $\epsilon$=2.71828
$\delta$=flux depth at $\phi$
$f$=frequency cycles/sec.
$\phi_0$=flux at start
$\phi$=flux penetrating to depth $\delta$ An approximation of the percentage of flux at, for instance, 153 kc. which will pass through a silver wedge of the dimensions shown in FIG. 7 as compared to the percentage of flux which would penetrate this wedge-shaped gap if the gap were only air, can now be made. In accordance with the chart of FIG. 5, it can be seen that for a thickness of .001" 88% of the flux produced at 153 kc. passes through, 76% passes through a .002" thickness, 66% passes through a .003" thickness, 57% passes through a .004" thickness and 48% passes through a .058" thickness. Thus the mean percentage flux which passes through is 67% of that which would have passed through had the gap been only air filled. It can now be seen that, through utilization of a wedge-shaped gap, of the dimensions shown in FIG. 7 filled with silver, the reluctance of the gap of the magnetic head is by a factor of $$\frac{2.53}{.67}-1$$

or 277% over the reluctance of the silver filled gap of the head of FIG. 6. Thus, by utilizing a silver filled wedge-shaped gap, the sensitivity of the head has been increased 3.77 times or the sensitivity of the head has been improved by 277%.

In the above-described manner, I have provided a magnetic head which is capable of simultaneously reading and writing from a particular memory channel. The magnetic head is extremely sensitive in that it requires relatively low write current while providing satisfactory read signals. In addition, through use of the novel magnetic head herein provided information can be read from the drum or other moving magnetic medium, acted upon and rewritten on the surface of the magnetic medium only .032" from the gap of the read head without producing excessive cross talk in the read head.

An integral part of this highly sensitive read-write head is the novel wedge-shaped gap having a silver wedge mounted therein which inhibits pulsating or alternating flux leakage between the yoke and bar and other areas than across the gap adjacent the moving magnetic medium. Thus, a highly efficient magnetic head has been provided since very high flux concentrations occur across the gap portion adjacent the moving magnetic medium while relatively little flux leakage occurs across the gap in non-adjacent areas.

Utilization of the subject magnetic head will undoubtedly open up many areas of computer activity in applications such as counting wherein information is to be read from a memory word, acted upon and re-recorded in the same memory word since large amounts of electronic circuitry in the form of shift registers are no longer required due to the very short delay which the subject head is capable of providing.

It should be apparent that, while I have described a delay magnetic head having read and write stages which utilize my novel gap configuration that conventional magnetic heads may be so constructed. Likewise, while I have described only one winding on each stage, a separate read and a separate write winding could be provided for each stage. Additionally, the novel gap configuration has proved admirably suited for use in conventional magnetic heads having separate read and separate write windings.

While there has been described what is at present considered to be a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A magnetic head capable of simultaneously reading and writing comprising: a read portion and a write portion, said read portion comprising a first bar and a first yoke member in magnetic association with each other across first upper and lower gaps, said first bar and first yoke being provided with spaced opposed nonparallel surfaces converging toward the extremities thereof to define a substantially wedge shaped lower gap, a layer of electrically opened conductive material disposed around at least one of said first bar and first yoke member, a winding wound on said first yoke member, said write portion comprising a second bar and a second yoke member in magnetic association with each other across second upper and lower gaps, said second bar and second yoke being provided with spaced opposed nonparallel surfaces converging toward the extremities thereof to define a substantially wedge shaped lower gap, a layer of electrically opened conductive material disposed around at least one of said second bar and second yoke member, and a winding wound on said second yoke member.

2. The magnetic head of claim 1 including means for variably establishing a selected spacing between said read and write portions.

3. A magnetic head capable of simultaneously reading and writing comprising: a read portion and a write portion, said read portion comprising a first bar and a first yoke member in magnetic association with each other across first upper and lower gaps, said first bar and first yoke being provided with spaced opposed nonparallel surfaces converging toward the extremities thereof to define a substantially wedge shaped lower gap, a wedge of high reluctance material mounted in said first lower gap, a layer of electrically opened conductive material disposed around at least one of said first bar and first yoke member, and a winding wound on said first yoke member, said write portion comprising a second bar and a second yoke member in magnetic association with each other across said upper and lower gaps, said second bar and second yoke being provided with spaced opposed nonparallel surfaces converging toward the extremities thereof to define a substantially wedge shaped lower gap, a wedge of high reluctance material mounted in said second lower gap, a layer of electrically opened conductive material disposed around at least one of said second bar and said second yoke member, and a winding wound on said second yoke member.

4. A magnetic head capable of simultaneously reading and writing comprising: a read portion and a write portion, said read portion comprising a first bar and a first yoke in magnetic association with each other across first upper and lower gaps, said first bar and first yoke being provided with spaced opposed nonparallel surfaces converging toward the extremities thereof to define a substantially wedge shaped lower gap, a wedge of high reluctance material mounted in said first lower gap, a layer of silver plated on said first bar which is electrically opened, and a winding wound on said first yoke, said write portion comprising a second bar and a second yoke in magnetic association with each other across second upper and lower gaps, said second bar and second yoke being provided with spaced opposed nonparallel surfaces converging toward the extremities thereof to define a substantially wedge shaped lower gap, a wedge of high reluctance material mounted in said second lower gap, and a layer of silver plated on said second bar which is electrically opened.

5. A magnetic head capable of simultaneously reading and writing comprising: a read portion and a write portion, said read portion comprising a first bar and a first yoke in magnetic association with each other across first upper and lower gaps, said first bar and first yoke being provided with spaced opposed nonparallel surfaces converging toward the extremities thereof to define a substantially wedge shaped lower gap, a silver wedge mounted in said first lower gap, a layer of silver plated on said first bar which is electrically opened, and a winding wound on said first yoke, said write portion comprising a second bar and a second yoke in magnetic association with each other across second upper and lower gaps, said second bar and second yoke being provided with spaced opposed nonparallel surfaces converging toward the extremities thereof to define a substantially wedge shaped lower gap, a silver wedge mounted in said second lower gap, and a layer of silver plated on said second bar which is electrically opened.

References Cited by the Examiner

UNITED STATES PATENTS

| | | | |
|---|---|---|---|
| 2,565,191 | 8/51 | Zenner | 179—100.2 |
| 2,662,120 | 12/53 | Anderson | 179—100.2 |
| 2,922,231 | 1/60 | Witt et al. | 340—174.1 |
| 2,969,529 | 1/61 | Gilson | 346—74 X |
| 3,026,379 | 3/62 | Carpenter | 179—100.2 |
| 3,037,089 | 5/62 | Warren | 179—100.2 |

FOREIGN PATENTS

| | | |
|---|---|---|
| 1,270,817 | 7/61 | France. |
| 680,681 | 8/39 | Germany. |
| 913,926 | 12/62 | Great Britain. |

IRVING L. SRAGOW, *Primary Examiner.*